United States Patent [19]
Fujimoto et al.

[11] Patent Number: 5,797,821
[45] Date of Patent: Aug. 25, 1998

[54] SHIFT CONTROL APPARATUS FOR AUTOMATIC TRANSMISSION

[75] Inventors: Shuichi Fujimoto, Kawagoe; Hisashi Kunii, Higashikurume; Kazumi Sato, Tokorozawa; Yoshiyuki Ura, Niiza; Takamichi Shimada, Sakado, all of Japan

[73] Assignee: Honda Giken Kogyo Kabushiki Kaisha, Tokyo, Japan

[21] Appl. No.: 627,406

[22] Filed: Apr. 4, 1996

[30] Foreign Application Priority Data

Apr. 5, 1995 [JP] Japan ................... 7-104820

[51] Int. Cl.$^6$ ............................... F16H 1/28
[52] U.S. Cl. ............................ 475/120; 477/117
[58] Field of Search ................ 475/120, 122; 477/117

[56] References Cited

U.S. PATENT DOCUMENTS

| | | | |
|---|---|---|---|
| 5,301,572 | 4/1994 | Tanaka et al. | 74/866 |
| 5,351,577 | 10/1994 | Ando et al. | 477/11.6 |
| 5,537,886 | 7/1996 | Toyama | 74/336 |
| 5,655,993 | 8/1997 | Fujimoto et al. | 477/117 |
| 5,679,095 | 10/1997 | Sekine et al. | 477/117 |

FOREIGN PATENT DOCUMENTS

| | | |
|---|---|---|
| 0 436 978 A2 | 7/1991 | European Pat. Off. . |
| 0 640 780 A2 | 3/1995 | European Pat. Off. . |
| 36-390 | 2/1961 | Japan . |
| 4254053 | 9/1992 | Japan . |
| 2 177 764 | 1/1987 | United Kingdom . |
| WO 94/12813 | 11/1992 | WIPO . |

OTHER PUBLICATIONS

European Search Report Communication (Feb. 3, 1998).

*Primary Examiner*—Dirk Wright
*Attorney, Agent, or Firm*—Lyon & Lyon LLP

[57] ABSTRACT

An automatic transmission includes a frictionally engaging element for establishing a predetermined speed range. This predetermined speed range may be a second or higher speed range, and it is set temporarily in N-D squat control and also used for establishing a reverse range. In this transmission, engagement-actuation control of the frictionally engaging element for establishing the predetermined speed range which is executed when a shift is made from a N range to a R range comprises a plurality of control stages. When a shift to the R range is made via the N range following a N-D shift, a shift control apparatus detects the engagement condition of the the frictionally engaging element for establishing the predetermined speed range, selects one of the control stages in correspondence with the engagement condition, and initiates the engagement-actuation control of the frictionally engaging element from the control stage selected, so as to execute an engagement control for establishing the reverse range. Thus, in-gear shifts are executed smoothly without any delay in a N-D-N-R range shift.

6 Claims, 11 Drawing Sheets

SHIFT CONTROL APPARATUS FOR AUTOMATIC TRANSMISSION

FIELD OF THE INVENTION

The present invention relates generally to an automatic transmission for use in vehicles, and particularly to a shift control apparatus capable of controlling the shift to a reverse range which is made through a neutral range following a shift from the neutral range to a forward range. Shift control from the neutral range to the forward range or to the reverse range is referred to as "in-gear control".

BACKGROUND OF THE INVENTION

Automatic transmissions comprise a plurality of gear trains. Their speed ranges are selected among a plurality of power transmission paths which are composed of these gear trains by actuating such frictionally engaging elements as clutches and brakes through the supply of hydraulic pressure. When a speed range shift is made, the power transmission paths switch to change the transmission gear ratio. If a shift is carried out suddenly, there arises a problem of shift shock. Therefore, various ideas have been contrived to adjust engagement of the frictionally engaging elements in order to carry out speed-range shifts smoothly without any shock.

This shift shock problem is especially noticeable when the shift lever is operated from the neutral range to the forward range or to the reverse range (which is referred to as "in-gear shift"). The reason is that there is a little input torque but a large ratio of transmission-torque change to engaging capacity change in the frictionally engaging element involved in the in-gear control when the transmission shifts from the neutral range having no load to the forward (or reverse) range. Therefore, this frictionally engaging element requires delicate engagements actuation control.

Various ideas have been proposed for this in-gear control. For example, because a sudden in-gear shift from neutral to forward tends to cause the car to move downwardly or "squat", which is undesirable, there is a transmission control generally referred to as "squat control." In one form of squat control, a higher speed range is temporarily set before establishing a first speed range (i.e., lowest speed range) when a shift is made from the neutral range to the forward range. This control smoothes out the change of output torque during the shift to the forward range and alleviates the shift shock at the time of in-gear. Specifically, Japanese Patent Publication No. H3(1991)-6390 discloses such a shift control method. When the shift lever is operated from the neutral range to the driving range while the vehicle speed is approximately zero with the accelerator pedal released and the parking brake applied, the lowest speed range is established after a higher speed range has been set temporarily.

Since the above mentioned in-gear control is intended only to make the shift from the neutral range to the driving range smooth, for example, if the shift lever is operated to the driving range soon after a shift is made from the driving range to the neutral range, the in-gear control of the prior art has experienced a problem of shift shock or shift delay. When a shift is made from the driving range to the neutral range, the hydraulic pressure in the frictionally engaging element for establishing the driving range is released. However, if a shift to the driving range is made immediately after the shift from the driving range to the neutral range, then the frictionally engaging element for establishing the driving range is supplied with excess hydraulic oil because some oil remaining from the previous actuation is still there. This condition makes the frictionally engaging element actuate for engagement suddenly, resulting in a problem of shift shock.

Japanese Laid-Open Patent Publication No. H4(1992)-254053 discloses a control apparatus to solve this shift shock problem. When shifts are repeatedly made between the neutral range and the driving range within a certain time period, this control apparatus adjusts the line pressure in correspondence with the time which has elapsed since each shift to the neutral range until the shift to the driving range (i.e., forward or reverse range).

This control apparatus alleviates the shift shocks occurring at the shifts repeated between the neutral range and the forward range or between the neutral range and the reverse range. However, this control apparatus is not effective in restraining the shift shock which occurs when a shift to the reverse range is made immediately after a shift from the forward range to the neutral range.

This shift shock problem is evidenced especially if squat control is applied as the in-gear control and the same frictionally engaging element which temporarily sets a predetermined higher speed range in shifting from the neutral range to the forward range is also used in shifting to the reverse range.

If a shift is made to the reverse range while squat in-gear control is executed in shifting from the neutral range to the forward range (especially while the frictionally engaging element for temporarily setting a higher speed range in squat control is engaging), then a shift shock is most likely. The reason is that the frictionally engaging element which engages temporarily to set the higher speed range also engages to establish the reverse range. If a shift is made to the reverse range when the frictionally engaging element has already engaged to a certain extent in the squat control, then the frictionally engaging element will receive a resupply of hydraulic pressure, which results in a sudden actuation of the frictionally engaging element for engagement and presents a problem of shift shock.

SUMMARY OF THE INVENTION

It is an object of the present invention to provide a shift control apparatus which is capable of executing in-gear control quickly without any shift shock.

Another object of the present invention is to provide a shift control apparatus which is capable of carrying out a smooth in-gear shift without delay even when a shift to a reverse range is made via a neutral range soon after a shift from the neutral range to a forward range.

Yet another object of the present invention is to provide a shift control apparatus which is capable of carrying out an in-gear shift smoothly without any delay in a squat in-gear control even when a shift to a reverse range is made via a neutral range soon after a shift from the neutral range to a forward range.

In order to achieve these objectives, the present invention is applied to an automatic transmission which comprises engagement-controlling means for controlling engagement-actuation of the frictionally engaging elements and is capable of establishing a forward range, a neutral range and a reverse range. When a shift is made from the neutral range to the forward range, a squat control is executed to establish a first speed range via a predetermined speed range, which is a second or higher speed range. In this transmission, a frictionally engaging element used for establishing this predetermined speed range is used also for establishing the reverse range. In the present invention, an engagement-actuation control which controls the frictionally engaging element for establishing the predetermined speed range when a shift is made from the neutral range to the reverse range comprises a plurality of control stages. When a shift to the reverse range is made via the neutral range following a shift from the neutral range to the forward range, the engagement condition of the frictionally engaging element for establishing the predetermined speed range is detected by D-N-R engagement-condition-detecting means. A control stage is selected in correspondence with this engagement condition, and the engagement-actuation control of the frictionally engaging element is initiated from this control stage to execute an engagement control for establishing the reverse range.

In this engagement control, when a shift is made from the neutral range to the forward range, the frictionally engaging element for establishing the predetermined speed range, which is the second or a higher speed range, temporarily engages during the squat control establishing the forward range. As the engagement condition of this frictionally engaging element is being detected, when a shift to the reverse range via the neutral range is made following this condition, the engagement-actuation control of the frictionally engaging element for establishing the predetermined speed range (used also for establishing the reverse range) can be executed on the basis of the condition at the time of the shift to the reverse range. In this way, the engagement actuation of this frictionally engaging element is effectively controlled, and the in-gear control to the reverse range is executed smoothly and quickly.

In an automatic transmission, an input member is generally connected to the engine through a torque convertor. Therefore, it is preferable that the D-N-R engagement-condition-detecting means detect the engagement condition on the basis of the absolute value of the difference between the rate of rotational change of the engine and the rate of rotational change of the turbine of the torque convertor as well as on the basis of the rotational speed of the turbine, classifying the condition into a case that the absolute value is detected smaller than a predetermined value and the rotational speed of the turbine is detected smaller than a predetermined rotational speed, a case that the absolute value is detected equal to or greater than the predetermined value, and a case that the absolute value is detected smaller than the predetermined value and the rotational speed of the turbine is detected equal to or greater than the predetermined rotational speed. Thereby, the engagement condition of the frictionally engaging element for establishing the predetermined speed range is detected appropriately.

In the case that the absolute value is detected smaller than the predetermined value and the rotational speed of the turbine is detected equal to or greater than the predetermined rotational speed, it is preferable that the engagement condition be determined on the basis of the time elapsed after the detection that the absolute value has become smaller than the predetermined value and the rotational speed of the turbine has become equal to or greater than the predetermined rotational speed. In this way, the engagement condition of the frictionally engaging element for establishing the predetermined speed range is detected more accurately.

However, the engagement condition of the frictionally engaging element for establishing the predetermined speed range changes during the squat in-gear control to the forward range when a shift is made from the neutral range to the forward range. Also, it changes during the time spent in the neutral range while a shift is made from the forward range to the reverse range via the neutral range. Therefore, if changes experienced during these periods are taken into consideration, then the engagement condition can be detected even more accurately.

Therefore, in the present invention, when the shift to the reverse range is made, the D-N-R engagement-condition-detecting means determines the engagement condition of the frictionally engaging element for establishing the predetermined speed range in consideration of changes which take place in the engagement condition of the frictionally engaging element after a shift from the neutral range to the forward range until a shift from the forward range to the neutral range.

The engagement-actuation control of the frictionally engaging element for establishing the predetermined speed range, which is executed in the shift from the neutral range to the driving range, may comprise an invalid-stroke-clearing stage, an intermediate-pressure retaining stage, and a releasing stage. In this case, the D-N-R engagement-condition-detecting means detects which of these control stages is executed for the frictionally engaging element for establishing the predetermined speed range at the time of the shift to the neutral range following a shift from the neutral range to the forward range. Thereafter, when a shift is made from the neutral range to the reverse range, it also detects the absolute value and the rotational speed of the turbine. Then, it determines the engagement condition on the basis of the absolute value and the rotational speed of the turbine as well as in consideration of the control stage detected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

Figure 1:
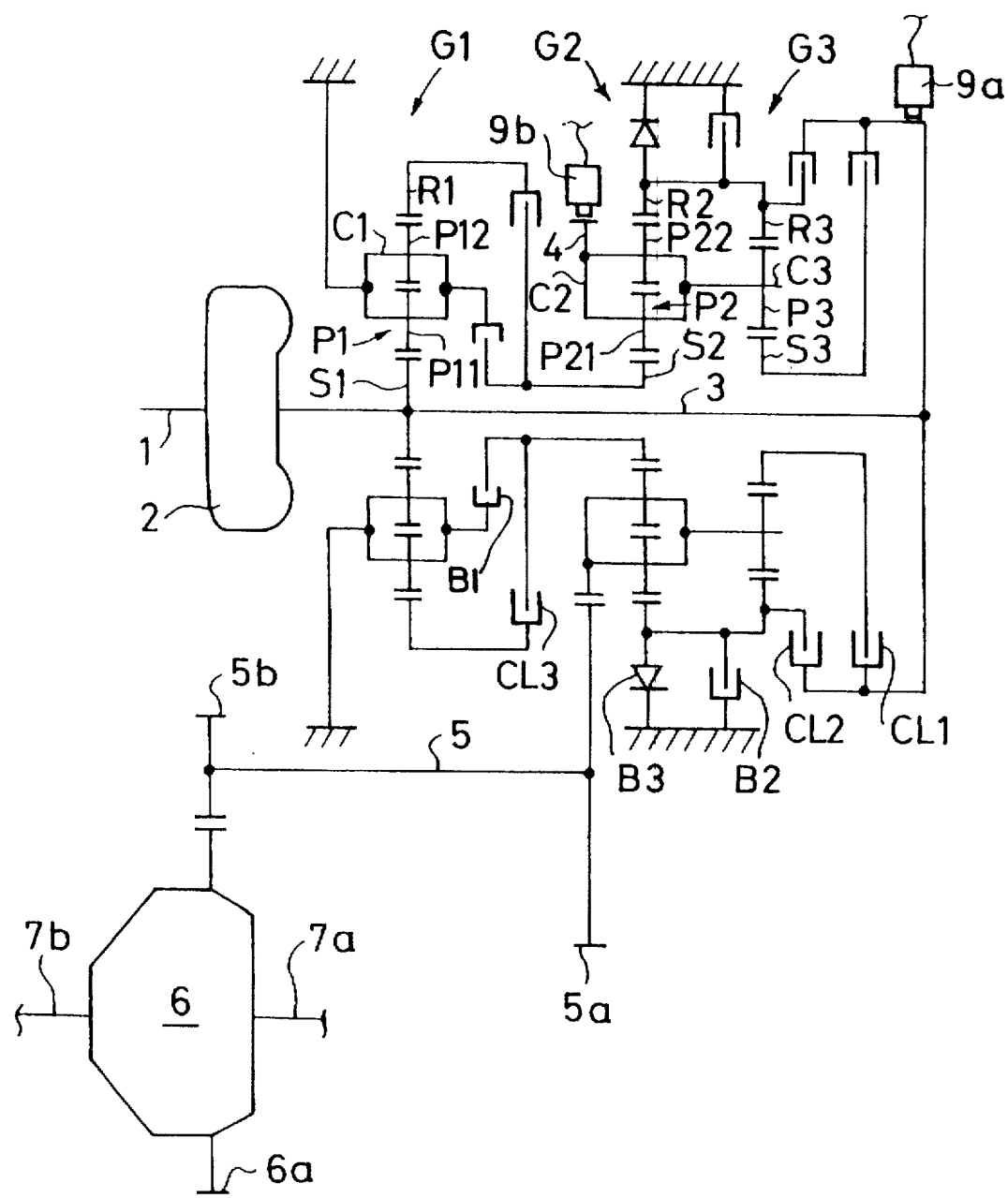
FIG. 1 is a schematic diagram of an automatic transmission which is controlled by a shift control apparatus according to the present invention.

FIG. 1 shows a power transmission system for use in an automatic transmission which is controlled by a shift control apparatus of the present invention.

This transmission comprises a torque converter 2 connected to an engine output shaft 1, an input shaft 3 connected to a turbine shaft of the torque converter 2, and a planetary transmission mechanism mounted on the input shaft 3.

The planetary transmission mechanism has first, second, and third planetary gear trains G1, G2 and G3 juxtaposed on the input shaft 3. The first, second, and third planetary gear trains comprise respective first, second, and third sun gears S1, S2 and S3 positioned centrally; respective first, second, and third planetary pinions P1, P2 and P3 in mesh with the first, second and third sun gears S1, S2 and S3, respectively, and revolving therearound while rotating about their own axes; respective first, second, and third carriers C1, C2 and C3 which rotatably support the respective planetary pinions P1, P2 and P3 and rotate therewith around the sun gears S1, S2 and S3, respectively; and respective first, second and third ring gears R1, R2 and R3, whose internal gear teeth mesh with the planetary pinions P1, P2 and P3, respectively.

The first and second planetary gear trains G1 and G2 are double-pinion planetary gear trains. The first and second pinions P1 and P2 comprise two pinons each P11 and P12, and P21 and P22, respectively.

The first sun gear S1 is connected to the input shaft 3 at all times. The first carrier C1 is fixedly retained to a housing and coupled to the second sun gear S2 through a first brake B1. Therefore, the first brake B1, when actuated, fixedly retains the second sun gear S2. The first ring gear R1 is engageably and disengageably coupled to the second sun gear S2 through a third clutch CL3. The second carrier C2 is coupled with the third carrier C3 at all times, and they are coupled to an output gear 4 at all times. The second ring gear R2 is coupled with the third ring gear R3 at all times, and they can be held against rotation by a second brake B2. Besides this second brake B2, they are also connected to the housing through a one-way brake B3, thus not rotatable in a forward drive direction. Furthermore, the second and third ring gears R2 and R3 are engageably and disengageably connected to the input shaft 3 through a second clutch CL2, and the third sun gear S3 is engageably and disengageably connected to the input shaft 3 through a first clutch CL1.

Furthermore, input and output rotation sensors 9a and 9b are provided as shown in the figure.

In the above described transmission, shifts of speed ranges are carried out by selectively engaging and disengaging the first, second and third clutches CL1, CL2 and CL3 and the first and second brakes B1 and B2. Specifically, five forward speed ranges (1ST, 2ND, 3RD, 4TH and 5TH) and one reverse speed range (REV) can be established by selectively engaging the clutches and brakes as indicated in Table 1 below.

In the table, the second brake B2 in the 1ST speed range is marked by a circle in parentheses to indicate that the 1ST speed range can be established by the one-way brake B3 with or without the engagement of the second brake B2. This means that when the first clutch CL1 is engaged, the 1ST speed range can be established without the engagement of the second brake B2. However, since the one-way brake B3 does not allow power transmission in the direction opposite to a forward drive direction, no engine brake is available in the 1ST speed range which is established without the engagement of the second brake B2. On the other hand, engine brake is available in the 1ST speed range if it is established with the engagement of the second brake B2. Thus, the 1ST speed range in the forward range D does not allow engine brake.

TABLE 1

| Speed range | CL1 | CL2 | CL3 | B1 | B2 |
|---|---|---|---|---|---|
| 1ST | O | | | | (O) |
| 2ND | O | | | O | |
| 3RD | O | | O | | |
| 4TH | O | O | | | |
| 5TH | | O | O | | |
| REV | | | O | | O |

Figure 2:
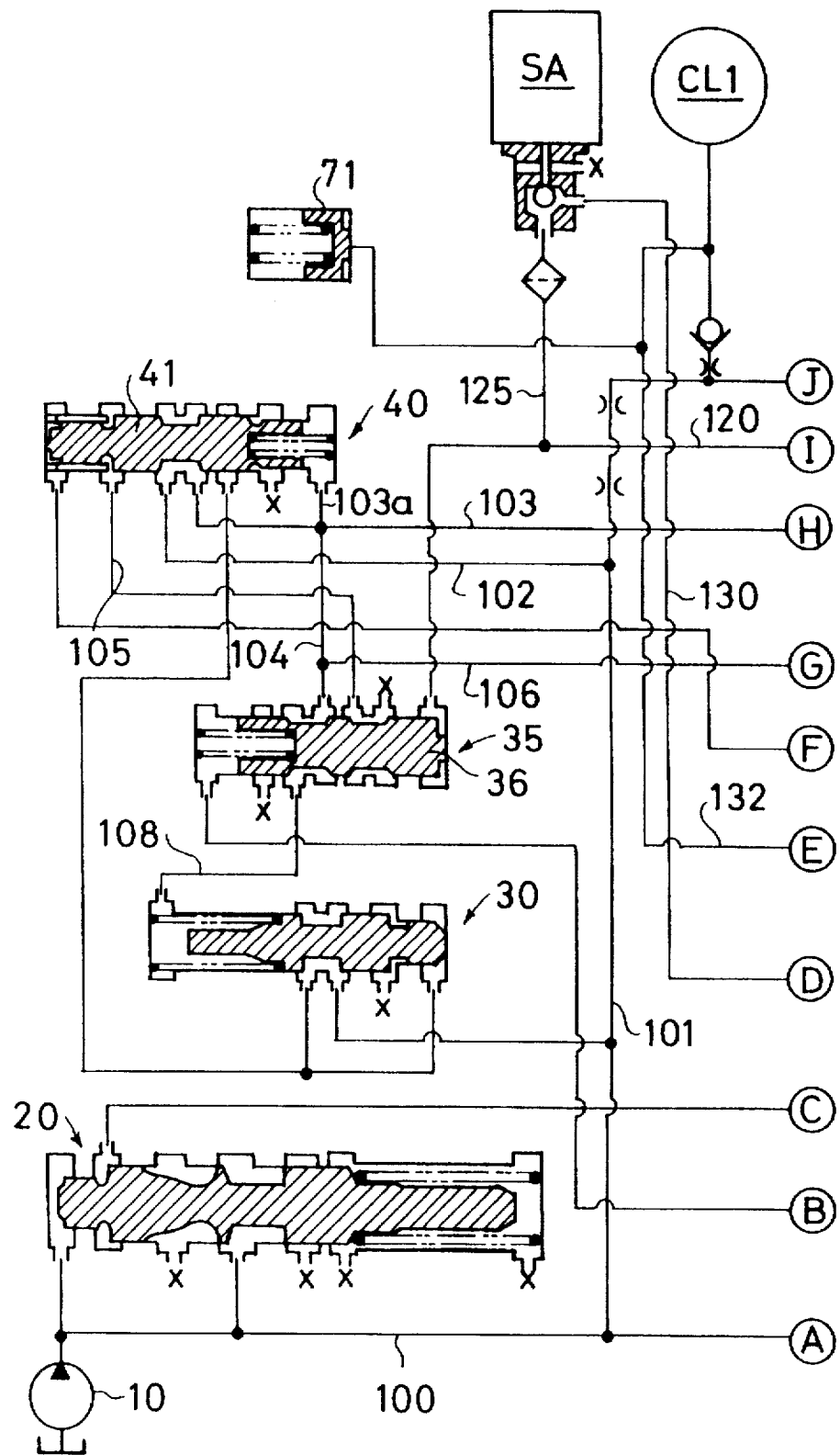
FIG. 2 is a partial hydraulic circuit diagram showing components of the shift control apparatus.
Figure 3:
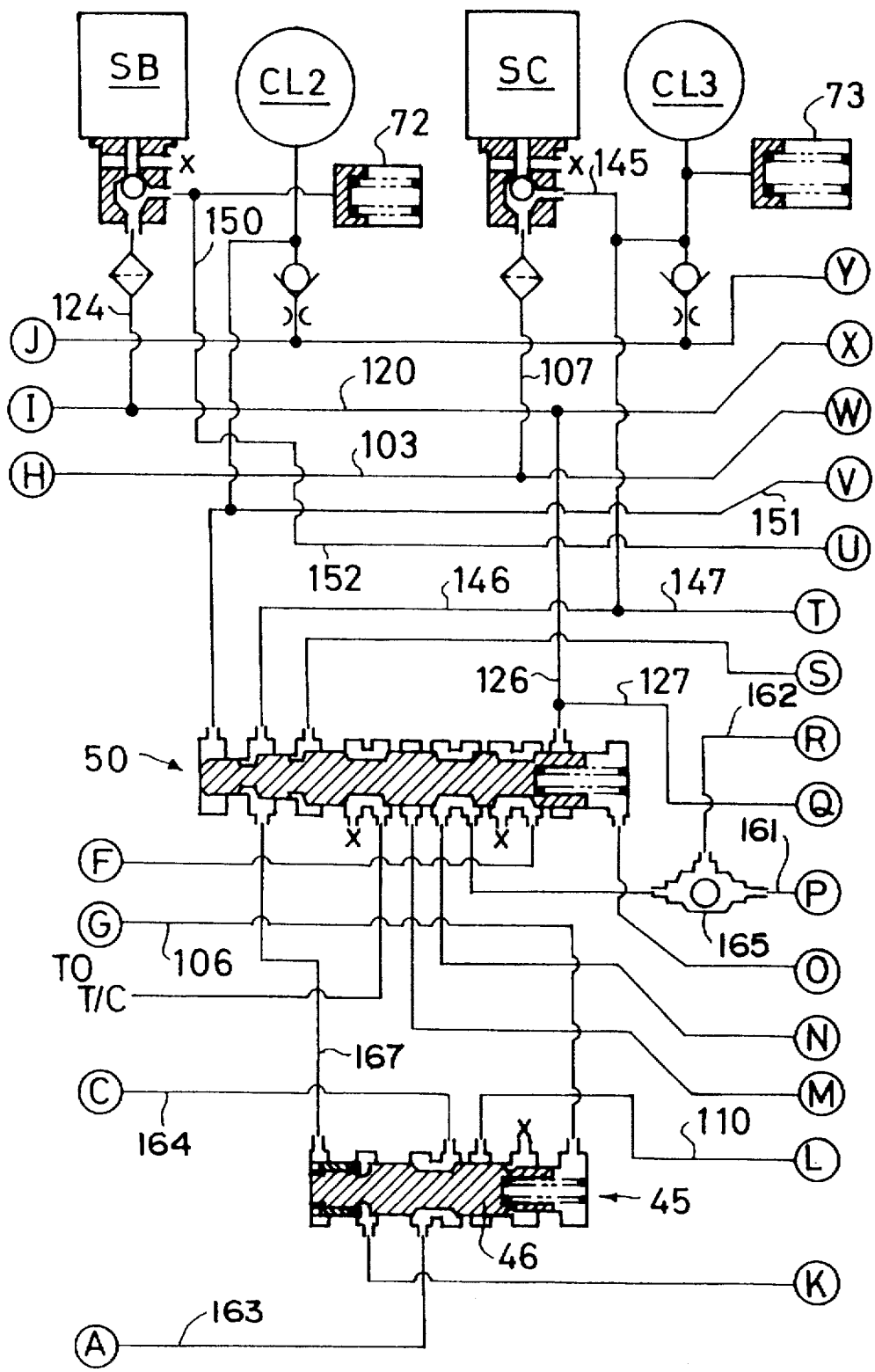
FIG. 3 is another partial hydraulic circuit diagram showing components of the shift control apparatus.
Figure 4:
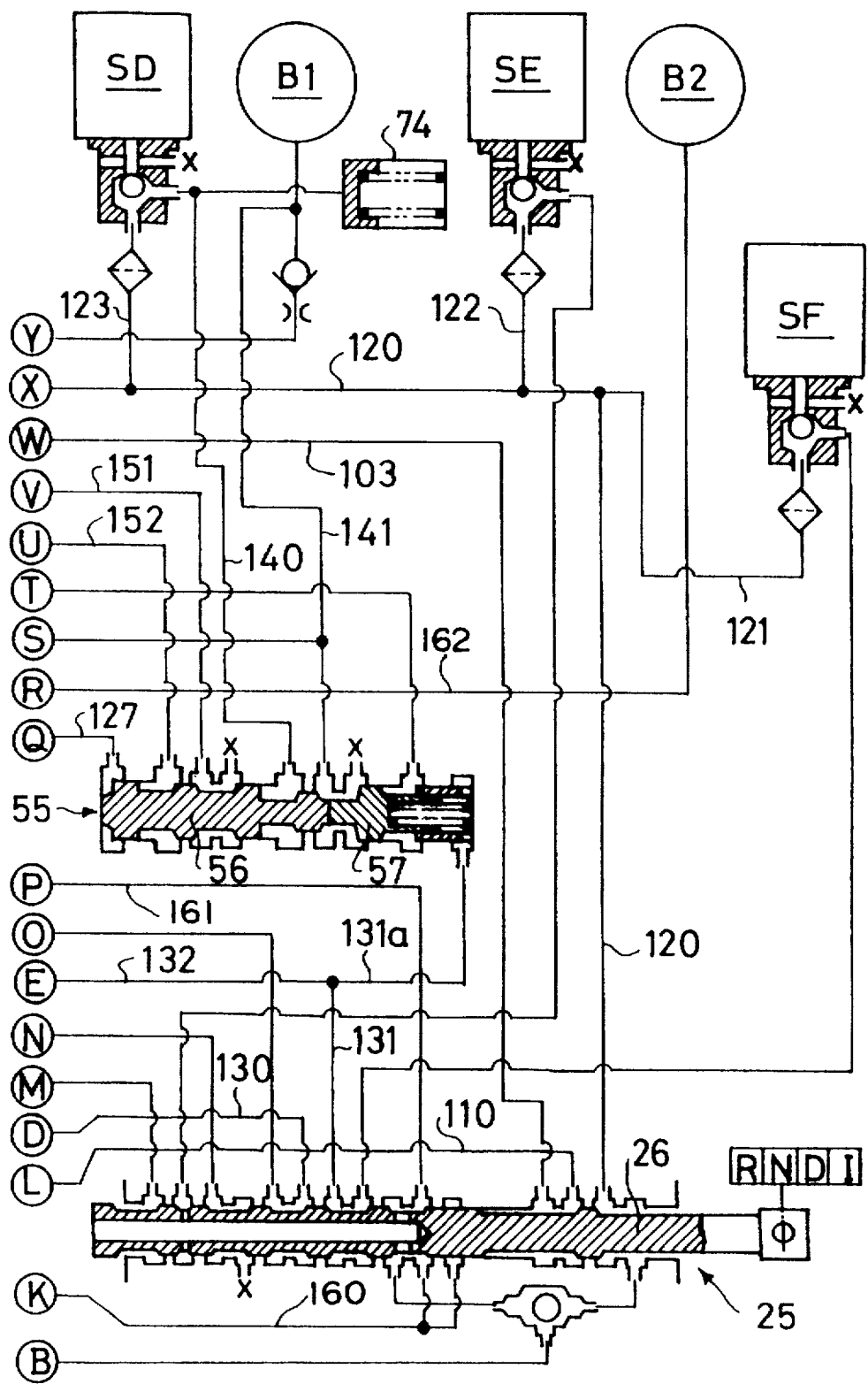
FIG. 4 is yet another partial hydraulic circuit diagram showing components of the shift control apparatus.

With reference to FIGS. 2, 3 and 4, a control apparatus for controlling engagement and disengagement of the first, second and third clutches CL1, CL2 and CL3 and the first and second brakes B1 and B2 will be described below. Each of the three drawings shows a respective portion of the control apparatus, composing a unified hydraulic circuit. Lines terminated with an identical alphabet letter (A~Y) in a circle in each drawing are continuous to each other, and lines marked with "X" are connected to a drain.

This control apparatus is supplied with hydraulic oil by a pump 10. This oil is first adjusted to a line pressure P1 by a regulator valve 20 and sent out through a line 100 as shown in the figures.

Besides this regulator valve 20, the control apparatus has a manual valve 25; six solenoid valves SA~SF; six hydraulic valves 30, 35, 40, 45, 50 and 55; and four accumulators 71, 72, 73 and 74. The manual valve 25 is connected to a shift lever at the driver's seat, and it is manually operated by the driver. The solenoid valves SA, SC and SF are normally-open type, so these valves are open while the solenoids are not energized. The solenoid valves SB, SD and SE are normally-close type, so these valves are closed while the solenoids are not energized.

In the following description, the hydraulic valves are each referred to as reducing valve 30, L-H shift valve 35, FWD pressure-switching valve 40, REV pressure-switching valve 45, delivery valve 50, and relief valve 55.

These hydraulic valves are actuated in response to the operation of the manual valve 25 and the solenoid valves SA~SF for the purpose of executing a shift control. Table 2 below shows the relation of the operation of the solenoid valves to the establishment of the speed ranges. "ON" and "OFF" in the table represent the turning on and off, respectively, of the solenoids. The operation of the solenoid valve SF is not shown in the table because it is not used for establishing a speed range but is used only for increasing the line pressure when the reverse speed range is established.

TABLE 2

| Speed | SOLENOID-OPERATED VALVE | | | | |
| --- | --- | --- | --- | --- | --- |
| ranges | SA | SB | SC | SD | SE |
| Type | N/O | N/C | N/O | N/C | N/C |
| 1ST | OFF | OFF | ON | OFF | OFF (ON upon Engine braking) |
| 2ND | OFF | OFF | ON | ON | OFF (ON upon Engagement of L/C) |
| 3RD | OFF | OFF | OFF | OFF | OFF (ON upon Engagement of L/C) |
| 4TH | OFF | ON | ON | OFF | OFF (ON upon Engagement of L/C) |
| 5TH | ON | ON | OFF | OFF | OFF (ON upon Engagement of L/C) |
| REV | OFF | OFF | OFF | OFF | OFF |

N/O: Normally-open; N/C: Normally-closed; and L/C: Lockup clutch.

First, a description will be given of a shift control which takes place when the D range (forward range) is selected with the shift lever moving a spool 26 in the manual valve 25 from position N, the position of the spool 26 shown in FIG. 4, to position D. When a hook on the right end of the spool 26 is positioned at "D", oil under the line pressure P1 is delivered to the manual valve 25 through lines 101 and 102 branched from the line 100 and then through a spool groove in the FWD pressure-switching valve 40 and a line 103. Then, the line pressure P1 is delivered through a groove on the spool 26 to lines 110 and 120. In this instance, the line 110 is closed off by the REV pressure-switching valve 45.

The oil under the line pressure P1 is then supplied from the line 120 to the solenoid valves SF, SE, SD, SB and SA through branched lines 121, 122, 123, 124 and 125, respectively. The line pressure P1 in the line 120 also acts on the right end of the L-H shift valve 35, moving a spool 36 thereof to the left. A line 126 branching from the line 120 is connected to the right end of the delivery valve 50, and a line 127 branching from the line 126 is connected to the left end of the relief valve 55, whereby spools 56 and 57 in the relief valve 55 are shifted to the right.

A line 103a branching from the line 103 is connected to the right end of the FWD pressure-switching valve 40 such that the line pressure P1 pushes a spool 41 in the FWD pressure-switching valve 40 to the left. The line pressure P1 is supplied to the left end of the FWD pressure-switching valve 40 through a line 104 branching from the line 103, through a groove on the spool 36 in the L-H shift valve 35, which has been shifted to the left, and then through a line 105. A line 106 branching from the line 104 is connected to the right end of the REV pressure-switching valve 45 such that a spool 46 in the REV pressure-switching valve 45 is kept shifted to the left by the line pressure P1.

A line 107 branching from the line 103 is connected to the solenoid valve SC, to supply the line pressure P1 thereto.

In the above described ways, the line pressure P1 is supplied to each of the solenoid valves SA~SF, which are controlled to open or close for the purpose of controlling the supply of the line pressure P1.

First, establishing the 1ST speed range is described. As the solenoid valve SF is not involved in establishing a forward range, only the solenoid valves SA~SE will be included in the description as shown in Table 2.

With reference to Table 2, only the solenoid valve SC is turned on, and the other solenoid valves are turned off for the 1ST speed range. As a result, only the solenoid valve SA opens, and the other solenoid valves close. When the solenoid valve SA opens, the line pressure P1 is supplied from the line 125 to a line 130 and then to a line 131 through a groove on the spool 26 at position D of the manual valve 25.

A line 131a branching from the line 131 is connected to the right end of the relief valve 55 such that the line pressure P1 acts on the right end of the relief valve 55. Furthermore, the line pressure P1 is supplied to the first clutch CL1 through a line 132 branching from the line 131, whereby the first clutch CL1 is actuated for engagement, and the pressure change which occurs in the first clutch CL1 is regulated by the first accumulator 71.

The second clutch CL2 is connected to the drain through the relief valve 55, whose spools 56 and 57 are shifted to the right, and through the solenoid valve SB. The third clutch CL3 is connected to the drain through the solenoid valve SC, and the first brake B1 is connected to the drain through the relief valve 55 and the solenoid valve SD. The second brake B2 is connected to the drain through the manual valve 25. Therefore, only the first clutch CL1 engages to establish the 1ST speed range.

Next, a description will be made of establishing the 2ND speed range. The solenoid valve SD, which was off for establishing the 1ST speed range, is turned on to open. As a result, the line pressure P1 is supplied to the first brake B1 from the line 123 through a line 140 and the relief valve 55, whose spools 56 and 57 are shifted to the right, and through a line 141. Therefore, the first clutch CL1 and the first brake B1 engage to establish the 2ND speed range.

For establishing the 3RD speed range, the solenoid valve SC is switched from on to off, and the solenoid valve SD is returned to off. Because the solenoid valve SD is returned to off, the first brake B1 is released. As the solenoid valve SC is turned off and opened, the line pressure P1 is supplied to the third clutch CL3 from the line 107 through a line 145. As a result, the third clutch CL3 engages to establish the 3RD speed range.

At the same time, the line pressure P1 acts on the left-hand portion of the delivery valve 50 through a line 146 branching from the line 145 and also acts on the right end of the relief valve 55 through a line 147 branching from the line 145.

For establishing the 4TH speed range, the solenoid valve SB is switched from off to on, and the solenoid valve SC is also turned on. As the solenoid valve SC is returned to on, the third clutch CL3 is released. As the solenoid valve SB opens, the line pressure P1 is supplied to the second clutch CL2 from the line 124 through lines 150 and 152 and a groove on the spool 56 shifted to the right in the relief valve 55 and through a line 151. As a result, the second clutch CL2 engages to establish the 4TH speed range.

For establishing the 5TH speed range, the solenoid valve SA is turned on, and the solenoid valve SC is turned off. As the solenoid valve SA is switched from off to on, the supply of the line pressure P1 to the line 130 is cut off, and the first clutch CL1 is connected to the drain through the solenoid valve SA. As a result, the first clutch CL1 is released. As the solenoid valve SC is switched off, the third clutch CL3 engages as described previously. As a result, the 5TH speed range is established.

Now, a description will be made for the case when the shift lever is operated to the position for establishing the reverse range (R range). As shown in Table 2, the solenoids of the solenoid valves SA~SE are all turned off to establish the reverse range. As a result, only the solenoid valves SA and SC are open while the solenoid valves SB, SD and SE are closed.

When the shift lever is shifted to position R, the spool 26 of the manual valve 25 is shifted to the left, from position N to position R, as shown in FIG. 4. With the spool 26 at position R, the line 120 is connected to the drain. Through this line 120, the solenoid valves SA, SB, SD, SE and SF are drained. Therefore, even though the solenoid valve SA is opened as mentioned above, the actuation pressure is not supplied through it.

However, the line pressure P1 is supplied to the solenoid valve SC through the line 103. When the solenoid valve SC is opened, the third clutch CL3 is actuated for engagement. While the shift to the R range is being carried out, if this actuation of the solenoid valve SC is controlled, then the engagement-actuation of the third clutch CL3 is controllable. In the present invention, this engagement-actuation is controlled so that occurrence of in-gear shock is prevented.

With the spool 26 of the manual valve 25 at position R, the line 103 connects with a line 160, which connects with a line 161. Then, the line 161 connects through a shuttle valve 165 with a line 162 leading to the second brake B2. Therefore, in the R range, the line pressure P1 is supplied through the manual valve 25 directly to the second brake B2 without going through any solenoid valve for the brake to be actuated for engagement.

As seen from this, when a shift to the R range is made, the second brake B2 is actuated straight-forwardly. As such, this engagement-actuation of the second brake B2 is not controllable. On the other hand, the engagement-actuation of the third clutch CL3 is controllable for establishing the R range through actuation-control of the solenoid valve SC.

In the R range, the line pressure P1 is supplied to the left side of the REV pressure-switching valve 45 through the line 160 so that the spool 46 of the REV pressure-switching valve 45 receives a thrust to the right. However, the line pressure P1 is also supplied to the right end of the spool 46 through the line 106. At this moment, the spool 46 remains at the left as shown in the figure because of a difference in pressure-receiving area of these portions. Thus, the lines 163 and 164 remain connected for a while. However, the REV pressure-switching valve 45 receives the pressure in the third clutch CL3 through the lines 146 and 167. This pressure from the third clutch CL3 acts on the spool 46 and shifts it to the right.

When the pressure in the third clutch CL3 becomes approximately the line pressure P1 during the engagement-actuation control of the third clutch CL3 through the solenoid valve SC, the spool 46 is shifted to the right, and the lines 163 and 164 are cut off. As a result, the line pressure P1 adjusted in the regulator valve 20 increases. In other words, in the R range, while the pressure in the third clutch CL3 is low, the line pressure P1 remains at the same pressure as in the D range. However, once the pressure in the third clutch CL3 reaches almost the line pressure P1, the line pressure P1 itself increases. Receiving this increased pressure, the third clutch CL3 and second brake B2 engage firmly.

Figure 5:
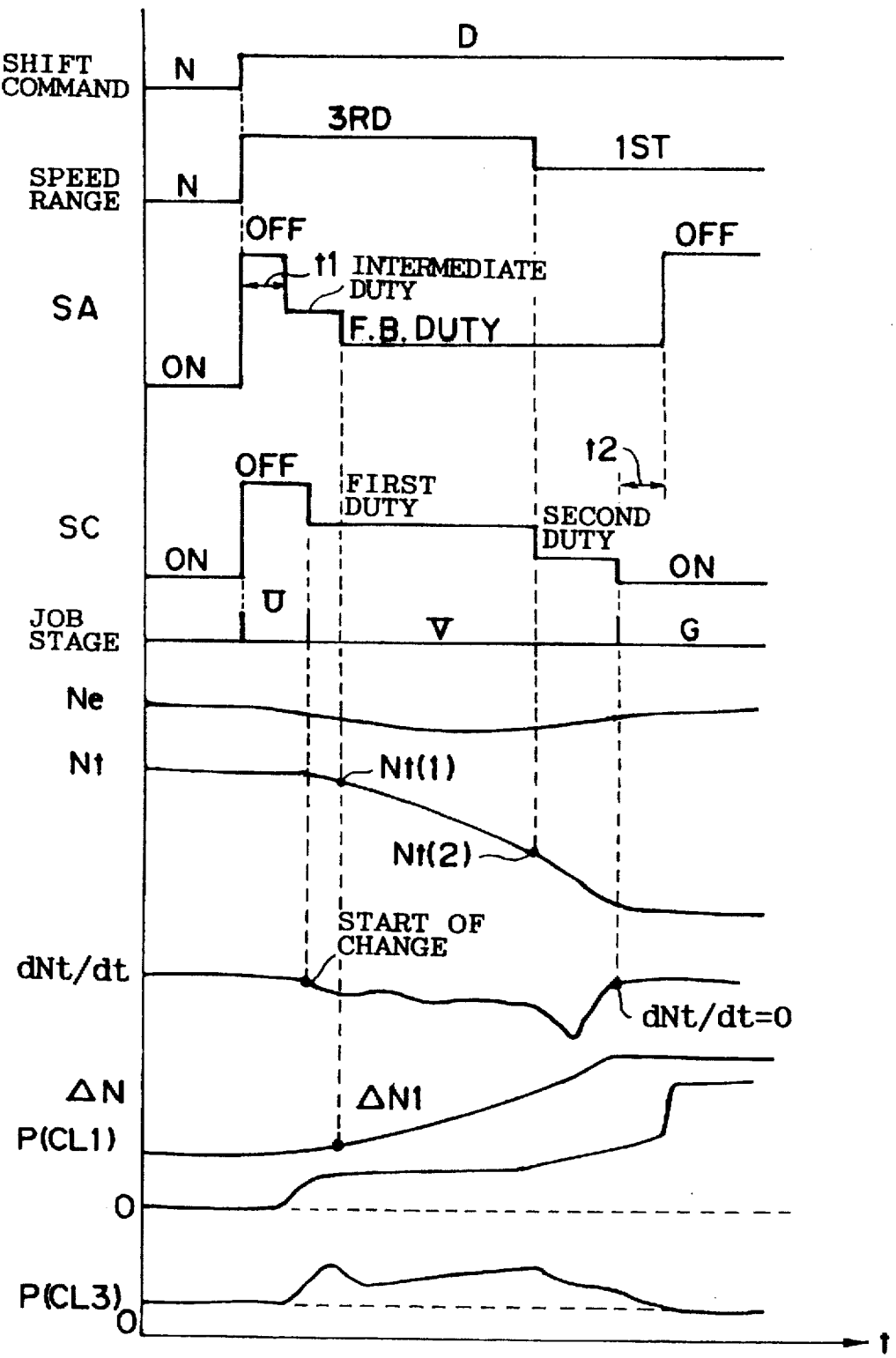
FIG. 5 is a chart showing the actuation condition of solenoid valves and chronological changes of various parameters during a N-D shift control executed by the shift control apparatus.

The clutches and brakes are controlled for engagement and disengagement in the manner described above. Now, a description will be made for the in-gear control from the N range (neutral range) to the D range (forward range), which is carried out when the shift lever is operated from position N to position D, with reference to a timing chart in FIG. 5 and a flowchart in FIGS. 6 and 7.

As shown in the flowchart, this shift from the N range to the D range is detected by the shift control apparatus at step S2. Here, if the shift is not to the D range, then the control flow returns since shifts other than to the D range are not targeted in this control. If the shift is from the N range to the D range, the control flow proceeds to step S4 to start a timer t1. Then, the solenoids of the solenoid valves SA and SC are turned off at step S6. The condition of the solenoid valve SC at this moment is flagged as F(J)=1 at step S8. Both solenoid valves SA and SC, which are both normally open type, are totally opened to supply hydraulic oil to the first and third clutches CL1 and CL3. As a result, the oil cylinders of the clutches are rapidly filled with oil. The pistons of the clutches are shifted quickly clearing their invalid strokes. The term "invalid stroke" means a piston stroke in the cylinder of an engaging element (such as clutches and brakes) through which no engaging force is applied on the engaging element. This control stage for the third clutch CL3 started at this moment is referred to as "Job U" (see FIG. 5).

After the elapse of a time set in the first timer t1, the control flow proceeds from step S10 to step S12. While the solenoid of the solenoid valve SC is kept turned off, i.e., in Job U, the solenoid valve SA is actuated at an intermediate duty cycle. This intermediate duty cycle is a duty cycle for the solenoid valve to generate a pressure to keep the clutch in a preengagement condition. Because of this, the supply of oil to the first clutch CL1 is constricted somewhat while the supply of oil to the third clutch CL3 is continued at the same rapid rate, so the third clutch CL3 starts engaging first.

In this control, the engine rotational speed Ne, the turbine rotational speed Nt of the torque convertor and the rate of turbine rotational change dNt/dt are being detected. When the turbine rotational speed Nt starts changing, i.e., a start of change is detected in the rate of turbine rotational change dNt/dt at step S14, the control flow proceeds to step S16 to actuate the solenoid valve SC at a first duty cycle (constant value), which is then flagged as F(J)=2 at step S18. The first duty cycle is a duty cycle for the solenoid valve to generate a pressure for engaging the third clutch CL3 loosely. With this pressure, the third clutch CL3 is kept in a predetermined engagement condition (loosely engaging condition) to establish the third speed range (3RD).

If the turbine rotational speed Nt decreases or changes to Nt(1) by a predetermined amount from the rotational speed detected at the time of the shift to the D range, or if the absolute value ΔN (=|Ne−Nt|) of the difference between the engine rotational speed Ne and the turbine rotational speed Nt reaches a predetermined value ΔN1, then the control flow proceeds from step S20 to step S22 to execute a feedback duty-cycle control on the solenoid valve SA. This feedback duty-cycle control is a feedback control which sets target values for the turbine rotational speed Nt and the rate of turbine rotational change dNt/dt.

Thereafter, if the turbine rotational speed Nt decreases to a predetermined rotational speed Nt(2), then the control flow proceeds from step S24 to step S26. The solenoid valve SC is actuated at a second duty cycle, which is a duty cycle to further reduce the actuation pressure P(CL3) of the third clutch CL3. The control stages executed at steps S16 and S26 for the third clutch CL3 are together referred to as "Job V".

When the rate of turbine rotational change dNt/dt becomes almost zero, the control flow proceeds from step S28 to step S30 to flag the condition as F(J)=3. Then, a time tracer Tpd is started at step S32, and a second timer t2 is started at step S34. Then, the solenoid of the solenoid valve SC is turned on at step S36 to release the third clutch CL3 completely, thereby finishing Job V. As such, the time tracer Tpd functions to count the time elapsed since the end of Job V.

The second timer t2 is set for the purpose of providing a waiting time for the first clutch CL1 to engage completely without any slip. When the time set in the second timer t2 elapses, the control flow proceeds from step S38 to step S40 to turn off the solenoid of the solenoid valve SA, thus maximizing the actuation pressure of the first clutch CL1. As a result, the first clutch CL1 engages fully without any slipping. There is no shift shock even though the actuation pressure is made maximum.

In this way, the in-gear squat control for the shift from the N range to the D range is carried out smoothly.

Figure 8:
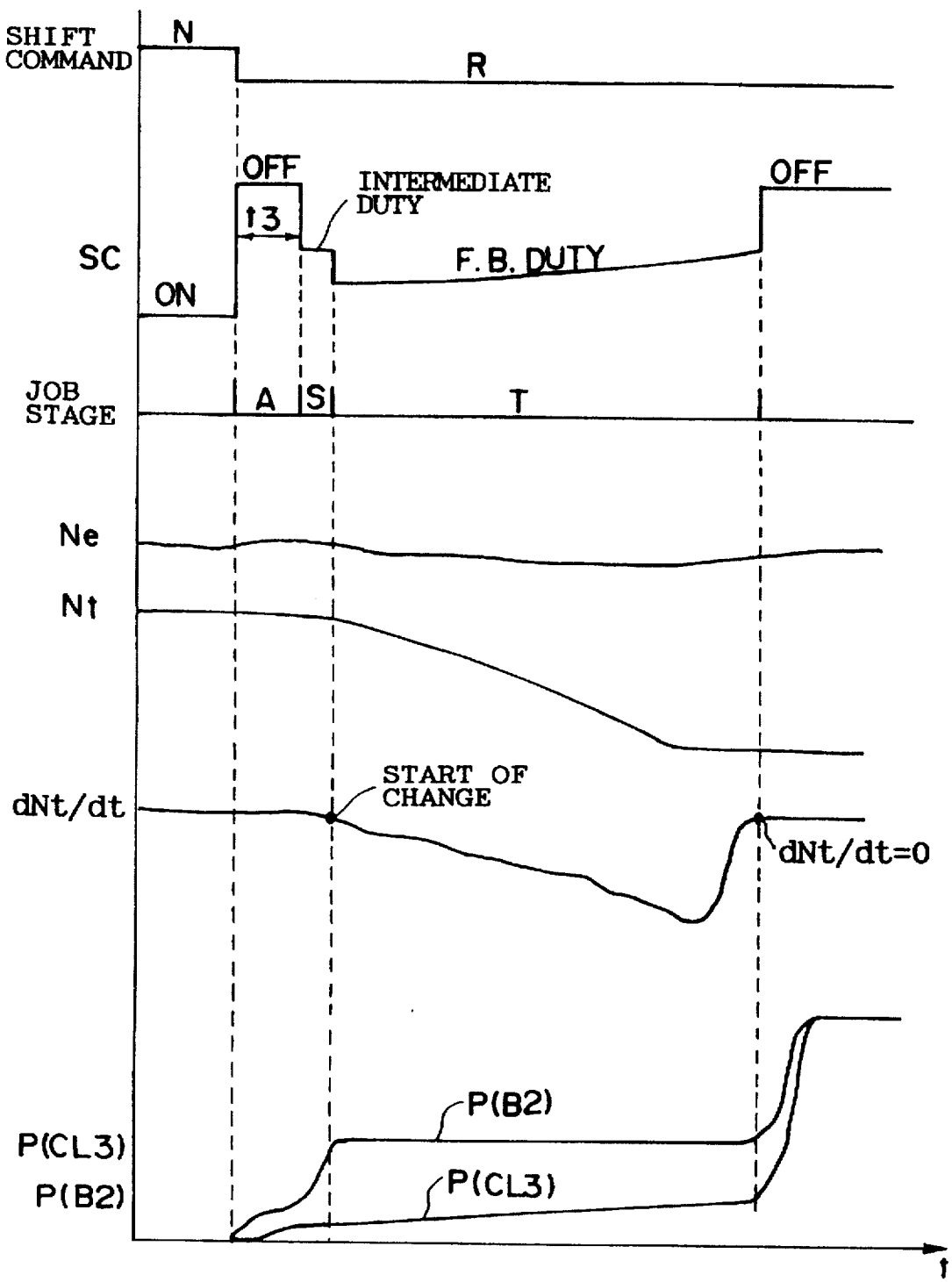
FIG. 8 is a chart showing the actuation condition of a solenoid valve and chronological changes of various parameters during a N-R shift control executed by the shift control apparatus.

Now, a description will be made for the in-gear control from the N range (neutral range) to the R range (reverse range), which is carried out when the shift lever is operated from position N to position R, with reference to a timing chart in FIG. 8 and a flowchart in FIG. 9.

When a shift from the N range to the R range is detected at step S50, the control flow proceeds to step S52 to determine the engagement condition of the clutch CL3, which is one of the frictionally engaging elements used for establishing the R range. This determination control is executed for solving the problem of shift shock which may occur if a N-D-N-R shift is executed in a short period of time. If the engagement-actuation control of the third clutch CL3 is executed wholly in the same manner irrespective of the partial or full engagement condition of the third clutch CL3 at the moment of the shift to the R range, then the engagement actuation of the third clutch CL3 becomes abrupt. This determination control is a key of the present invention, so it will be described later in detail.

First, a description will be made for the case that a shift from the N range to the R range is made while the third clutch CL3 is completely released (this is referred to as "ordinary N-R shift control").

In this case, the control flow proceeds to step S54 to start a third timer t3. Then, the solenoid of the solenoid valve SC is turned off, and the solenoid valve SC, normally open type, is totally opened at step S56. Therefore, oil is rapidly supplied to the third clutch CL3, and the oil cylinder of the clutch is rapidly filled with the oil. The piston of the clutch is shifted quickly clearing its invalid stroke. This control stage is referred to as "Job A".

This condition is maintained for a time period set in the third timer t3. After the elapse of the time, the control flow proceeds to step S60. This step S60 is to accept a skip-over from step S52 if the condition determined at step S52 is in a predetermined condition. In the ordinary N-R shift control, step S60 is skipped, and the control flow proceeds to step S62 to actuate the solenoid valve SC at the intermediate duty-cycle. This control stage is referred to as "Job S". In this stage, the pressure supplied to the clutch CL3 is restrained by a certain amount.

In this control, the engine rotational speed Ne, the turbine rotational speed Nt of the torque convertor and the rate of turbine rotational change dNt/dt are being detected. When the turbine rotational speed Nt starts changing, i.e., when a start of change is detected in the rate of turbine rotational change dNt/dt at step S64, the control flow skipping step S66, which is not required for the ordinary N-R shift control, proceeds to step S68 to actuate the solenoid valve SC at the feedback duty cycle. Whether the control flow should proceed to step S68 may be judged on the basis of the absolute value ΔN (=|Ne−Nt|) of the difference between the engine rotational speed Ne and the turbine rotational speed Nt instead of on the basis of the start of change in the rate of turbine rotational change dNt/dt. This feedback duty-cycle control is a feedback control which sets target values for the turbine rotational speed Nt and the rate of turbine rotational change dNt/dt and reduces the turbine rotational speed Nt at a predetermined rate. This control stage is referred to as "Job T".

Thus, the third clutch CL3 is engaged, and the turbine rotational speed Nt decreases gradually to zero. When the rate of turbine rotational change dNt/dt becomes almost zero, the control flow proceeds from step S70 to step S72 to turn the solenoid of the solenoid valve SC off. This control ends after resetting the flags and timers at step S74, which were set in the determination process of engagement condition at step S52 and in the processes described in FIGS. 6 and 7.

In this way, the shift from the N range to the R range is carried out smoothly and quickly.

Next, a description will be made for the control executed when a shift is made to the the N range and then to the R range while the squat control is being executed in a shift from the N range to the D range (this control is referred to as "D-N-R shift control").

In this case, the third clutch CL3 is temporarily engaged while the squat control is being executed in the shift from the N range to the D range. Therefore, the engagement-condition determination control at step S52 in FIG. 9 is executed to determine the condition of the third clutch CL3 at the time of the shift to the N range.

Figure 10:
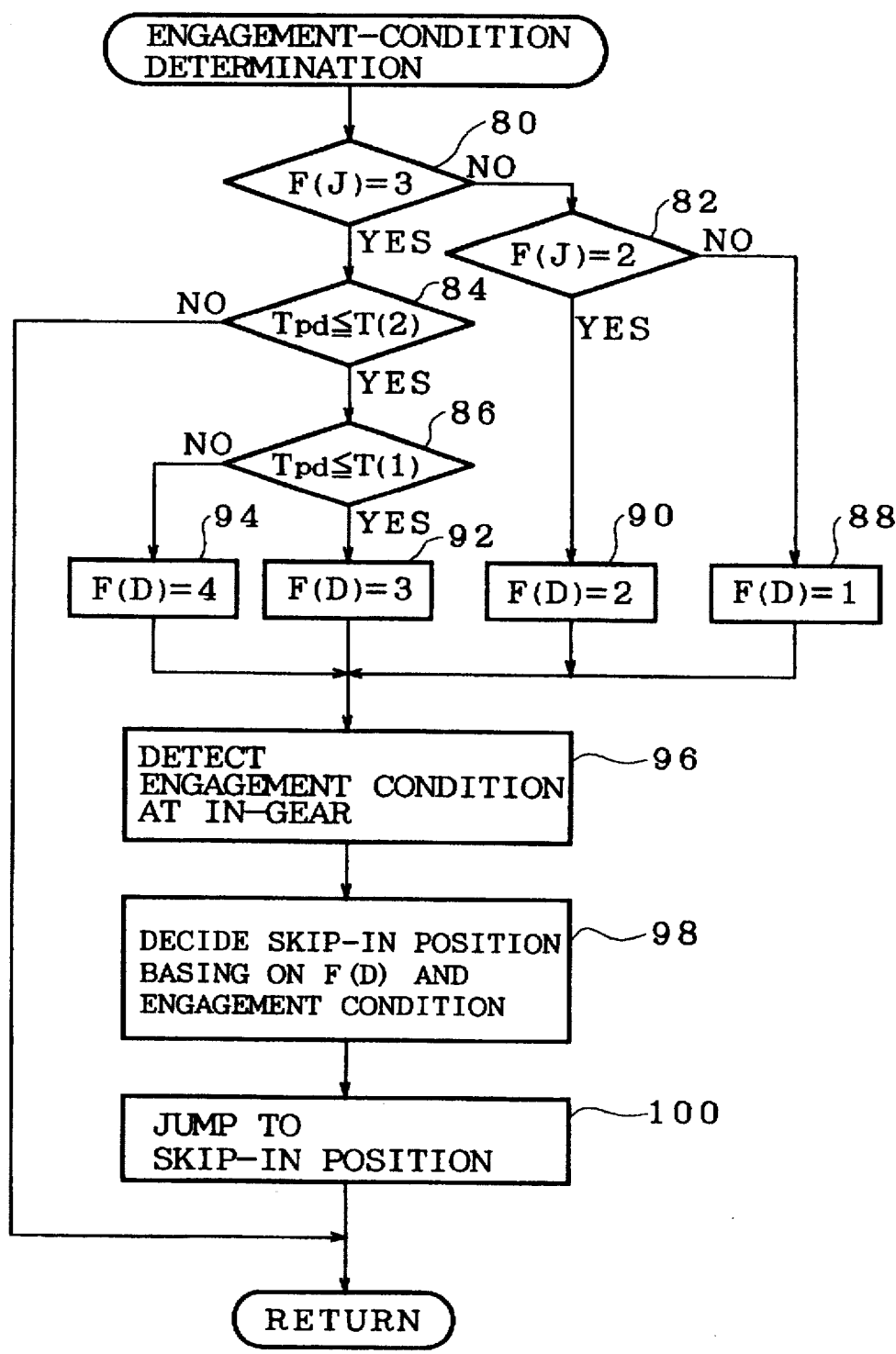
FIG. 10 is a flowchart showing processes of a determination control for determining engagement condition, which are executed by the shift control apparatus.

FIG. 10 shows the processes of this engagement-condition determination control in detail. In this control, the values of the flags F(J) assigned in the squat control executed in the shift from the N range to the D range (shown in FIGS. 6 and 7) are determined at steps S80 and S82. If F(J)=1, then the control flow proceeds to step S88 to set an engagement-condition flag as F(D)=1. If F(J)=2, then the control flow proceeds to step S90 to set the engagement-condition flag F(D)=2.

If F(J)=3, then the control flow proceeds to steps S84 and S86 to determine the time Tpd counted by the time tracer. If the time Tpd is shorter than a first critical time T(1), then the engagement-condition flag is set F(D)=3 at step S92. If the time Tpd is longer than the first critical time T(1) but shorter than a second critical time T(2) {>T(1)}, then the engagement-condition flag is set F(D)=4 at step S94. If the time Tpd is longer than the second critical time T(2), then this control routine finishes, and the control flow proceeds to step S54 (refer to FIG. 9).

Figure 6:
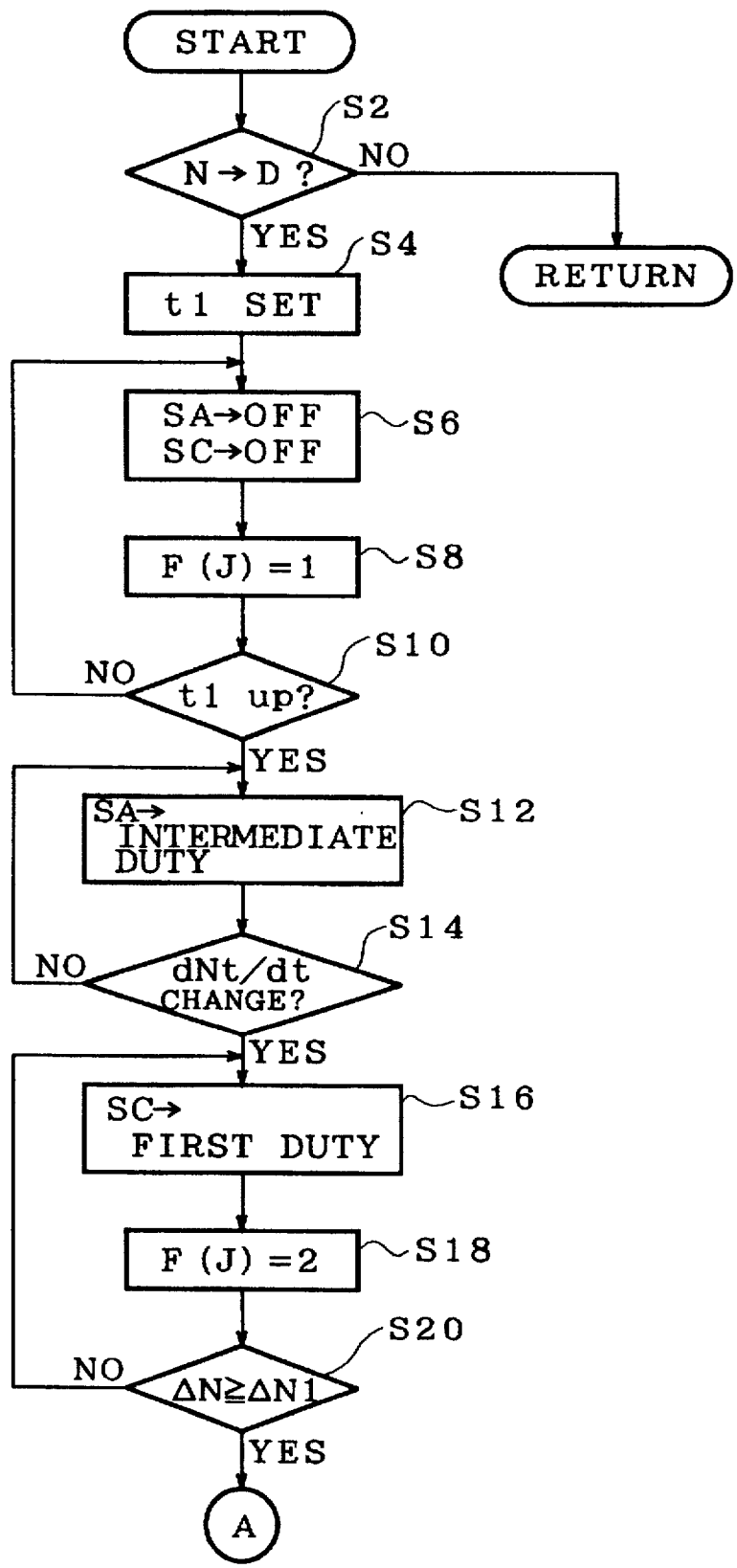
FIG. 6 is a flowchart showing processes of the N-D shift control.
Figure 7:
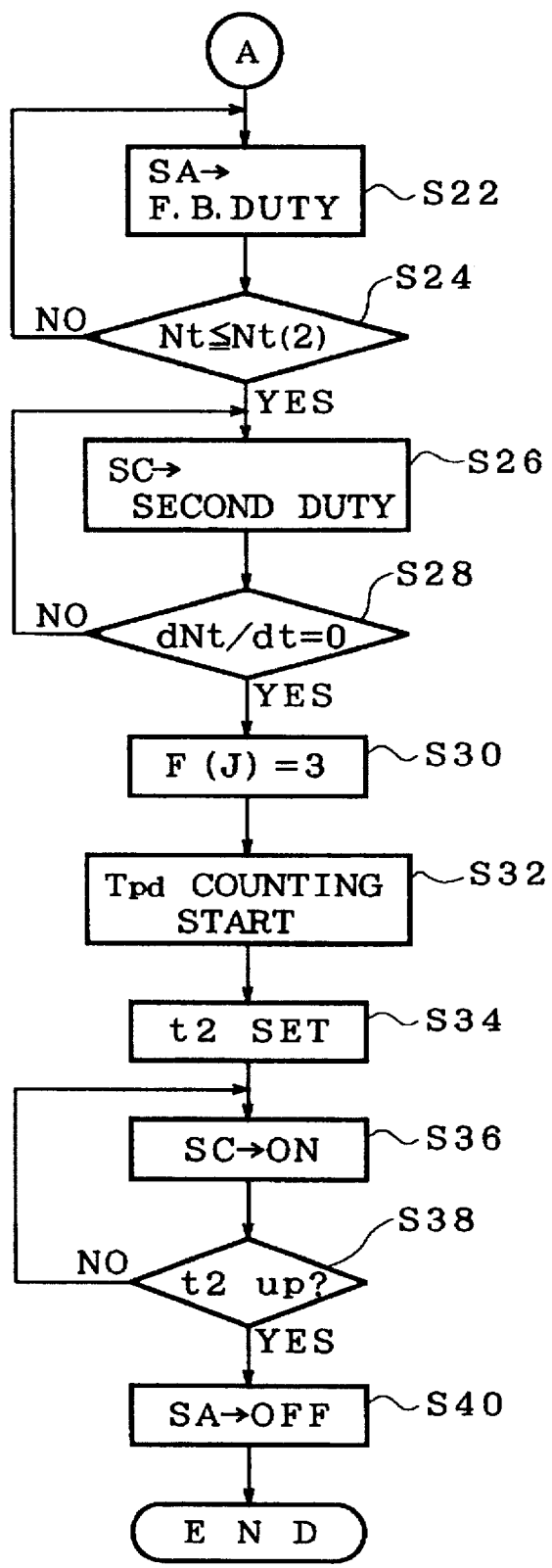
FIG. 7 is a flowchart showing processes of the N-D shift control.

When the shift is returned to the N range (referred to as "out-gear time") while the squat control is being executed for the previous shift from the N range to the D range, the control described in FIGS. 6 and 7 is interrupted. At this moment, the above mentioned flag F(J) and the time tracer Tpd are to indicate the engagement condition of the third clutch CL3. If the third clutch CL3 at the out-gear time has F(D)=1, then it is in Job U. If it has F(D)=2, then it is in Job V. If it has F(D)=3, then it is in the condition which is defined within the first critical time T(1) after the completion of Job V. If it has F(D)=4, then it is in the condition which is defined within the second critical time T(2), where the third clutch CL3 has completed Job V and passed the condition defined by the first critical time T(1).

Then, the control flow proceeds to step S96 to detect the engagement condition of the third clutch CL3 at the time of the shift to the R range (referred to as "R in-gear") after the return to the N range as mentioned above. It is important for the engagement condition of the third clutch CL3 to be detected at the time of the shift to the R range (at the R in-gear time) because the condition changes after the return to the N range before the shift to the R range (during the period since the out-gear time until the R in-gear time). This detection is executed with determinations whether the turbine rotational speed Nt is greater than a predetermined rotational speed a or not and whether the absolute value ΔRN (=|dNe/dt−dNt/dt|) of the difference between the rate of rotational change of the engine dNe/dt and the rate of rotational change of the turbine dNt/dt is greater than a predetermined value β or not.

In these determinations, if Nt>α and ΔRN<β, then the condition is judged as in a first engagement condition KJ1. If ΔRN≧β, then the condition is judged as in a second engagement condition KJ2. If Nt≦α and ΔRN<β, then the condition is judged as in a third engagement condition KJ3.

Figure 9:
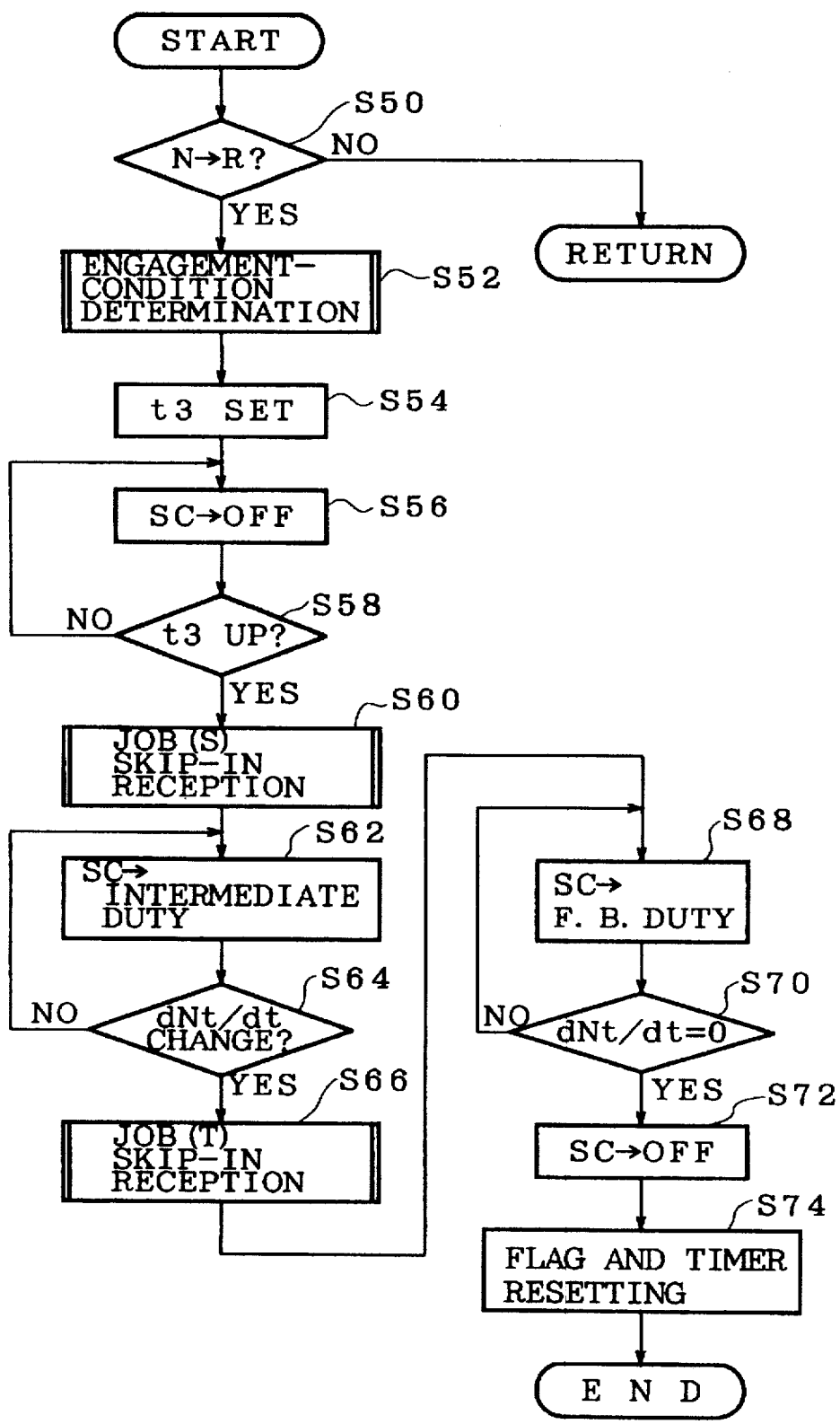
FIG. 9 is a flowchart showing processes of the N-R shift control.

On the basis of the above described engagement conditions F(D) flagged at the out-gear time and of the engagement conditions KJ1–3 detected at the in-gear time, the job or control stage from which the engagement-actuation control of the third clutch CL3 is started for the R in-gear control (skip-in position) is decided at step S98 as shown in Table 3. Then, the control flow jumps out at step S100 to a respective position (step S60 or S66 in FIG. 9) and initiates the control therefrom.

predetermined time period NT2 (i.e., within a short period of time), then the control flow proceeds to step S60 in FIG. 9 to initiate the R in-gear control from Job S because it is considered that some oil is still remaining in the third clutch CL3. On the other hand, after the out-gear time, if an R in-gear command is generated after the elapse of the second predetermined time period NT2, then the R in-gear control is initiated from Job A, which is the first control stage, because it is considered that all oil has evacuated from the third clutch CL3.

As shown in (C), when a shift to the N range (out-gear command) is generated while the third clutch CL3 is in Job V in the N-D in-gear control, the engagement-condition flag is F(J)=2, and the turbine rotational speed Nt has decreased to a certain degree as shown in the figure. Therefore, when the shift to the N range is made, the turbine rotational speed starts to increase. At this moment, the invalid-stroke clearing of the third clutch CL3 has been completed, and the third clutch CL3 is in an engagement condition (semi-engagement condition).

For an R in-gear after this out-gear, a determination is made for the engagement condition of the third clutch CL3 at the time of the generation of an R in-gear command. If this R in-gear is generated while the third clutch CL3 is in the

TABLE 3

|  | In-gear time | | | | |
| --- | --- | --- | --- | --- | --- |
|  | First engagement condition (KJ1) | | | Second engagement condition (KJ2) | Third engagement condition (KJ3) |
| Out-gear time | t(NT) > NT2 | NT2 ≧ t(NT) > NT1 | t(NT) < NT1 | | |
| F(D) = 1 | Job A | Job S | Job S | — | — |
| F(D) = 2 | Job A | Job S | Job S | Job T | Job T |
| F(D) = 3 | Job A | Job A | Job S | Job S | Job T |
| F(D) = 4 | Job A | Job A | Job A | Job S | Job S |
| F(D) = 0 | Job A | Job A | Job A | Job A | Job A |

Figure 11:
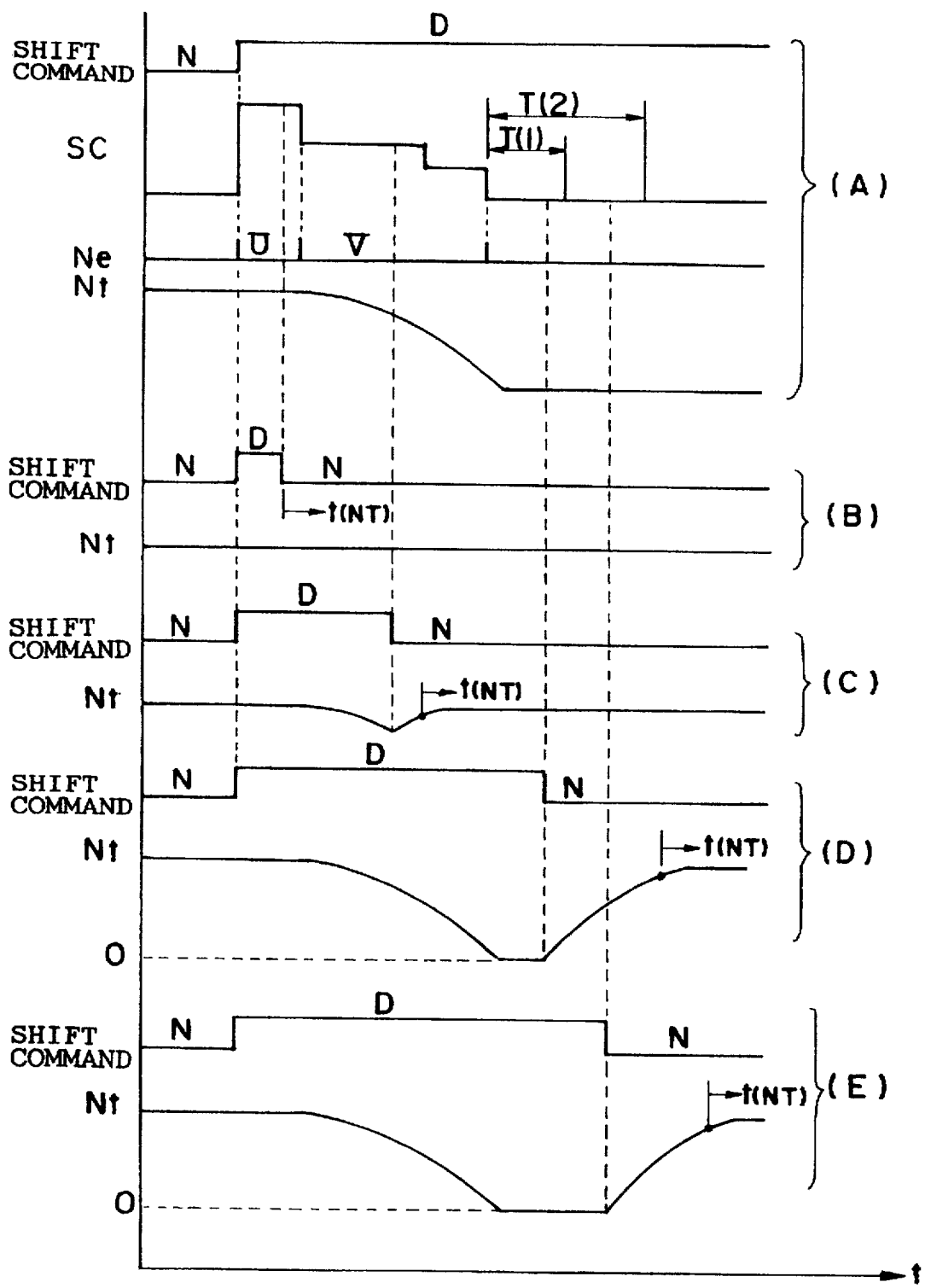
FIG. 11 is a chart showing the relationships between shift commands and turbine rotational changes in a N-D-N shift carried out by the shift control apparatus.

With reference to FIG. 11, a description is made of how the job to be started among the jobs listed in Table 3 is decided. Section (A) of FIG. 11 shows a shift command, actuation signals for the solenoid valve SC and chronological changes of the rotational speeds of the engine and the turbine for the N-D in-gear control. Sections (B)–(E) show changes in the rotational speed of the turbine which take place when a shift command for the N range is generated while the N-D in-gear control is being executed.

As shown in (B), a shift command for the N range (out-gear command) is generated when the third clutch CL3 is in Job U in the N-D in-gear control. At this moment, the engagement-condition flag is F(J)=1, and the turbine rotational speed Nt has not started to decrease yet as seen from the figure. Therefore, Nt>α and ΔRN<β, so the third clutch CL3 is judged as in the first engagement condition KJ1. However, it is considered that the supply of hydraulic oil to the third clutch CL3 has already started and that the invalid-stroke clearing has progressed to a certain degree.

Therefore, the time t(NT) elapsed since the conditions of Nt>α and ΔRN<β have been reached is measured until an R in-gear command is generated. In correspondence with the time t(NT) detected, the job to be initiated is decided as in Table 3. In this case, the time t(NT) is a time elapsed after the out-gear time until the R in-gear time. For example, after the out-gear time, if an R in-gear command is generated within a first predetermined time period NT1 or a second first engagement condition KJ1, then the time t(NT), which has been counted since Nt>α and ΔRN<β until the generation of the R in-gear command, is read in, and the Job to be initiated is decided in accordance with Table 3. On the other hand, if the R in-gear is generated while third clutch CL3 is in the second or third engagement condition KJ2 or KJ3, then the control flow jumps to step S66 in FIG. 9 to execute the R in-gear control from Job T because it is considered that the third clutch CL3 is in a semi-engagement condition.

As shown in (D), when an out-gear command is generated within the first critical time T(1) after the third clutch CL3 has finished Job V in the N-D in-gear control, the engagement-condition flag is F(J)=3, and the turbine rotational speed Nt has decreased completely as shown in the figure. Therefore, when the shift is returned to the N range, the turbine rotational speed Nt starts to increase. At this moment, it is considered that the third clutch CL3 is in a loose engagement condition or almost free of engagement.

After this out-gear, a determination is made for the engagement condition of the third clutch CL3 at the time of the generation of an R in-gear command. If the R in-gear is generated while the third clutch CL3 is in the first engagement condition KJ1, then the time t(NT) is read in, and the Job to be initiated is decided in accordance with Table 3. As described above, the third clutch CL3 is almost released from engagement at the time of the out-gear. Therefore, if t(NT)<NT1, then Job S is initiated. For other conditions, Job A is initiated to execute the control from the beginning.

On the other hand, if an R in-gear command is generated while third clutch CL3 is in the second condition KJ2, then Job S is initiated. If the R in-gear is generated while third clutch CL3 is in the third condition KJ3, then Job T is initiated.

As shown in (E), when an out-gear command is generated within the second critical time T(2) after the third clutch CL3 has finished Job V in the N-D in-gear control, the engagement-condition flag is F(J)=4. It is considered that the third clutch CL3 is closer to disengagement. Therefore, if the third clutch CL3 is in the first engagement condition KJ1 at the time of the generation of an R in-gear command after the out-gear, then Job A is initiated to execute the control from the beginning.

On the other hand, if an R in-gear command is generated while third clutch CL3 is in the second or third condition KJ2 or KJ3, then Job S is initiated.

By the way, the engagement-condition flag F(D)=0 means a normal N-R shift control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 7-104820 filed on Apr. 5, 1995, which is incorporated herein by reference.

What is claimed is:

1. A shift control apparatus for an automatic transmission comprising:

a plurality of power transmission paths provided between an input member and an output member for establishing speed ranges;

a plurality of frictionally engaging elements for selectively establishing a predetermined power transmission path among said power transmission paths;

engagement-controlling means for controlling engagement actuation of said frictionally engaging elements;

said transmission being capable of establishing a forward range, a neutral range and a reverse range, said forward range establishing forward speed ranges, said neutral range cutting off power transmission between said input and output members, and said reverse range establishing reverse speed ranges;

a control for establishing a first speed range via a predetermined speed range being executed when a shift is made from said neutral range to said forward range, said predetermined speed range being a second or higher speed range;

a selected frictionally engaging element of said plurality of frictionally engaging elements being used for establishing said predetermined speed range and for establishing said reverse range;

an engagement-actuation control of said selected frictionally engaging element which is executed when a shift is made from said neutral range to said reverse range including a plurality of control stages; and D-N-R engagement-condition-detecting means which detects engagement condition of said selected frictionally engaging element when the shift to said reverse range is made via said neutral range following the shift from said neutral range to said forward range;

wherein:

when the shift to said reverse range is made following the shift from said neutral range to said forward range, said engagement-controlling means selects a control stage in correspondence with the engagement condition detected by said D-N-R engagement-condition-detecting means and initiates the engagement-actuation control of said selected frictionally engaging element from the control stage selected, so as to execute an engagement control for establishing said reverse range.

2. The shift control apparatus as set forth in claim 1 wherein:

said input member is connected to an engine through a torque converter; and said D-N-R engagement-condition-detecting means detects said engagement condition on a basis of an absolute value of a difference between a rate of rotational change of said engine and a rate of rotational change of a turbine of said torque converter as well as on a basis of a rotational speed of said turbine, classifying said engagement condition into:

a case that said absolute value is detected smaller than a predetermined value and the rotational speed of said turbine is detected smaller than a predetermined rotational speed, a case that said absolute value is detected equal to or greater than the predetermined value, and a case that said absolute value is detected smaller than the predetermined value and the rotational speed of said turbine is detected equal to or greater than the predetermined rotational speed.

3. The shift control apparatus as set forth in claim 1 or 2 wherein:

in the case that said absolute value is detected smaller than the predetermined value and the rotational speed of said turbine is detected equal to or greater than the predetermined rotational speed, said engagement condition is determined from a time elapsed since a detection that said absolute value has become smaller than the predetermined value and the rotational speed of said turbine has become equal to or greater than the predetermined rotational speed until the shift to said reverse range.

4. The shift control apparatus as set forth in claim 1 or 2 wherein:

said D-N-R engagement-condition-detecting means takes into consideration changes occurred in said engagement condition of said selected frictionally engaging element for establishing said predetermined speed range after a shift has been made from said neutral range to said forward range until a shift is made to said neutral range and determines said engagement condition of said frictionally engaging element when a shift is made to said reverse range.

5. The shift control apparatus as set forth in claim 4 wherein:

said engagement-actuation control of said selected frictionally engaging element which is executed when a shift is made from said neutral range to said driving range comprises:

an invalid-stroke-clearing stage where a pressure signal for setting a maximum pressure is generated for a first predetermined time period to clear an invalid stroke, an intermediate-pressure retaining stage where a pressure signal for setting an intermediate pressure is generated after said first predetermined time period until a frictionally engaging element for establishing said first speed range reaches a predetermined engagement condition, and a releasing stage where a pressure signal for reducing a pressure is generated after the frictionally engaging element for establishing said first speed range has reached said predetermined engagement condition; and said D-N-R engagement-condition-detecting means detects which control stage among said control stages is executed for said selected frictionally engaging element when a shift to said neutral range is made following a shift from said neutral range to said forward range and also detects said absolute value and the rotational speed of said turbine, and determines said engagement condition in consideration of the control stage detected as well as on a basis of said absolute value and the rotational speed of said turbine.

6. The shift control apparatus as set forth in claim 3 wherein:

said D-N-R engagement-condition-detecting means takes into consideration changes occurred in said engagement condition of said selected frictionally engaging element after a shift has been made from said neutral range to said forward range until a shift is made to said neutral range and determines said engagement condition of said selected frictionally engaging element when a shift is made to said reverse range.

\* \* \* \* \*

UNITED STATES PATENT AND TRADEMARK OFFICE
CERTIFICATE OF CORRECTION

PATENT NO.    : 5,797,821
DATED         : August 25, 1998
INVENTOR(S)   : Fujimoto It is certified that error appears in the above-identified patent and that said Letters Patent is hereby corrected as shown below:

Column 16,
Line 54, before "frictionally" insert -- selected --.

Signed and Sealed this

Thirteenth Day of August, 2002

Attest:

JAMES E. ROGAN
Attesting Officer    Director of the United States Patent and Trademark Office